US010923273B2

(12) United States Patent
Mehas et al.

(10) Patent No.: US 10,923,273 B2
(45) Date of Patent: Feb. 16, 2021

(54) COIL DESIGN FOR WIRELESS POWER TRANSFER

(71) Applicant: Integrated Device Technology, Inc., San Jose, CA (US)

(72) Inventors: Gustavo J. Mehas, Mercer Island, WA (US); Tao Qi, San Diego, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 98 days.

(21) Appl. No.: 16/228,551

(22) Filed: Dec. 20, 2018

(65) Prior Publication Data

US 2019/0198240 A1  Jun. 27, 2019

Related U.S. Application Data

(60) Provisional application No. 62/609,243, filed on Dec. 21, 2017.

(51) Int. Cl.
| | | |
|---|---|---|
| *H01F 38/14* | (2006.01) | |
| *H02J 50/12* | (2016.01) | |
| *H01F 27/28* | (2006.01) | |
| *H02J 7/02* | (2016.01) | |

(52) U.S. Cl.
CPC ............ *H01F 38/14* (2013.01); *H01F 27/28* (2013.01); *H01F 27/2871* (2013.01); *H02J 50/12* (2016.02); *H02J 7/025* (2013.01)

(58) Field of Classification Search
CPC ...... H01F 38/14; H01F 27/28; H01F 27/2871; H02J 50/12; H02J 7/025; H02J 7/02
See application file for complete search history.

(56) References Cited

U.S. PATENT DOCUMENTS

| 8,814,046 B1 | 8/2014 | Wallner |
| 9,697,450 B1 | 7/2017 | Lee |
| 2005/0068019 A1 | 3/2005 | Nakamura et al. |
| 2014/0117760 A1 | 5/2014 | Baarman et al. |
| 2016/0012966 A1* | 1/2016 | Davis ..................... B60L 53/30 307/104 |
| 2016/0149416 A1 | 5/2016 | Ha et al. |
| 2017/0040694 A1 | 2/2017 | Singh et al. |
| 2017/0070058 A1 | 3/2017 | Corum et al. |
| 2017/0178802 A1 | 6/2017 | Yang et al. |
| 2019/0012586 A1 | 1/2019 | Liu et al. |

OTHER PUBLICATIONS

International Search Report and Written Opinion issued by the International Searching Authority dated Sep. 27, 2018 for PCT Application No. PCT/US2018/041026. pp. 1-13.
International Search Report and Written Opinion issued by the International Searching Authority dated Mar. 5, 2019 for PCT Application No. PCT/US2018/067126. pp. 1-15.

* cited by examiner

*Primary Examiner* — Robert L Deberadinis
(74) *Attorney, Agent, or Firm* — Haynes and Boone, LLP (57) ABSTRACT

In some embodiments, a transmit coil configuration is provided. A coil configuration for a wireless transmitter according to some embodiments can include a plurality of turns coupled between a first tap coupled to an innermost turn and a second tap coupled to an outermost turn; and at least one adjustment tap coupled to at least one turn of the transmitter coil between the innermost turn and the outermost turn. The transmission coil can include an MST coil coupled to the second tap of the transmission coil. In some embodiments, the MST coil can include a plurality of turns arranged in one of a circle, an oval, an egg shape, or a square shape.

14 Claims, 9 Drawing Sheets

COIL DESIGN FOR WIRELESS POWER TRANSFER

RELATED ART

The current disclosure claims priority to U.S. Provisional Application 62/609,243, filed on Dec. 21, 2017, which is herein incorporated by reference in its entirety.

TECHNICAL FIELD

Embodiments of the present invention are related to wireless charger systems and, in particular, to coil designs used in Wireless Power Transfer Systems.

DISCUSSION OF RELATED ART

Mobile devices, for example smart phones, tablets, wearables and other devices are increasingly using wireless power charging systems. In general, wireless power transfer involves a transmitter driving a transmit coil and a receiver with a receiver coil placed proximate to the transmit coil. The receiver coil receives the wireless power generated by the transmit coil and uses that received power to drive a load, for example to provide power to a battery charger.

Typically, a wireless power system includes a transmitter coil that is driven to produce a time-varying magnetic field and a receiver coil that is positioned relative to the transmitter coil to receive the power transmitted in the time-varying magnetic field. Such coils can also be used for or used with magnetic secured transmission (MST) of data between the transmitter and the receiver.

There are multiple different standards currently in use for the wireless transfer of power. The more common standards for wireless transmission of power include the Alliance for Wireless Power (A4WP) standard and the Wireless Power Consortium standard, the Qi Standard. Under the Wireless Power Consortium, the Qi specification, a resonant inductive coupling system is utilized to charge a single device at the resonance frequency of the receiver coil circuit. In the Qi standard, the receiving device coil is placed in close proximity with the transmission coil while in the A4WP standard, the receiving device coil is placed near the transmitting coil, potentially along with other receiving coils that belong to other charging devices.

Typically, a wireless power system includes a transmitter coil that is driven to produce a time-varying magnetic field and a receiver coil, which can be part of a device such as a cell phone, PDA, computer, or other device, that is positioned relative to the transmitter coil to receive the power transmitted in the time-varying magnetic field. The design of the coils can affect the efficiency of the wireless power transfer.

In most systems, a transmitter includes a transmission coil that efficiently transmits the wireless power and a receiver includes a receiver coil that efficiently receives the wireless power. The transmission coil and the receiver coil have different constructions in order to perform their functions.

Therefore, there is a need to develop better coil technologies for the wireless transmission of power.

SUMMARY

In some embodiments, a transmit coil configuration is provided. A coil configuration for a wireless transmitter according to some embodiments can include a plurality of turns coupled between a first tap coupled to an innermost turn and a second tap coupled to an outermost turn; and at least one adjustment tap coupled to at least one turn of the transmitter coil between the innermost turn and the outermost turn. A wireless power transmission system can include a controller; a transmission coil, the transmission coil comprising a plurality of turns with an innermost turn coupled to a first tap and an outermost turn coupled to a second tap, and at least one adjustment tap coupled to at least one turn of the transmitter coil between the innermost turn and the outermost turn, the second tap coupled to a first output node of the controller and the first tap coupled a second output node of the controller; and at least one switch coupled controlled by the controller and coupled between the second tap and the at least one adjustment tap, wherein the transmission controller adjusts the at least one switch to control an active area of the transmission coil. The transmission coil can include an MST coil coupled to the second tap of the transmission coil. In some embodiments, the MST coil can include a plurality of turns arranged in one of a circle, an oval, an egg shape, or a square shape.

These and other embodiments are further discussed below with respect to the following figures.

These and other aspects of the present invention are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

A transmitter coil according to some embodiments can include a plurality of turns coupled between a first lead and a second lead; and at least one tap coupled to a turn of the transmitter coil at a spot between the first lead and the second lead. In some embodiments, a magnetic secured transmission (MST) coil can be coupled to the outer turn of the plurality of turns.

Figure 1:
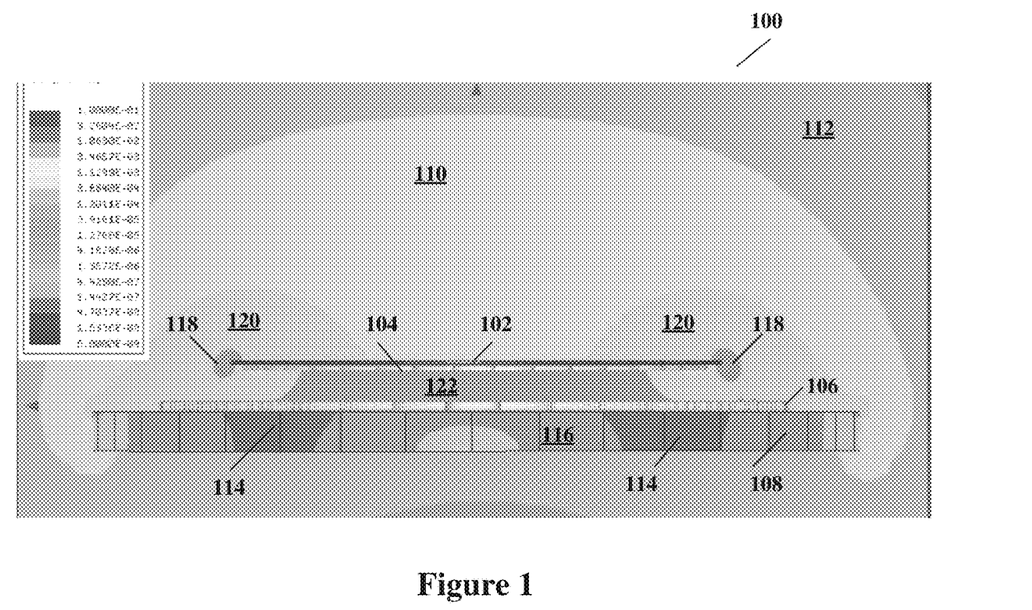
FIG. 1 illustrates magnetic fields around the transmit coil and the receive coil where the area of the transmit coil is larger than the area of the receive coil.

FIG. 1 illustrates magnetic field strengths between a transmit coil 106 and a receive coil 104 that are positioned a distance apart in a wireless power transmission configuration 100. As illustrated in FIG. 1, transmit coil 106 is mounted on a substrate 108 while receive coil 104 is mounted on a substrate 102, each of which can use a ferromagnetic material. In configuration 100, the area of receive coil 104 is smaller than the area of transmit coil 106. Transmit coil 106 can have a diameter on the order of 10 cm in many cases, although any diameter and number of turns can be used. The ferrite material is at the center of transmit.

As illustrated in the field map illustrated in FIG. 1, magnetic field strengths around configuration 100 illustrates strong field in areas 118, 122, and 114. A strong field strength 122 is coupled through coil 104. As illustrated in FIG. 1, with about 3 A of current through transmit coil 106, the magnetic field in areas 116, 118, and 122 is about 1E-2 Tesla, the field strength in area 114 is about 3E-2 Tesla. The field strength in area 110 is about 1E-3 Tesla and the field strength in area 112 is about 1E-5 Tesla. In such systems, there can be a large amount of friendly metal heating, causing loss of efficiency in the power transfer system and potentially causing heating damage in the receiving device. The friendly metal occurs near areas 118, 120, 110, and 112 in the receiving device.

Figure 2:
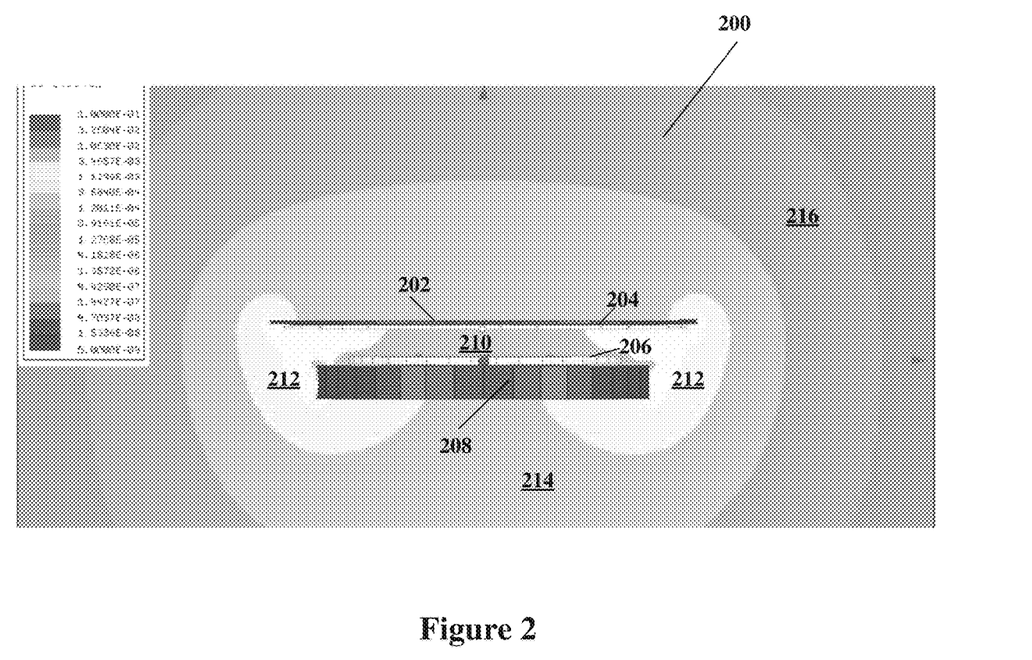
FIG. 2 illustrates magnetic fields around the transmit coil and the receive coil where the area of the transmit coil is smaller than the area of the receive coil.

The heating can be much lower in a system where the area of the receive coil is larger than the area of the transmit coil. FIG. 2 illustrates a receive coil 204 mounted on a substrate 202 placed a separation distance over a transmit coil 206 mounted on a substrate 208. As is illustrated in FIG. 2, the area of receive coil 204 is greater than the area of transmit coil 206. As is illustrated in FIG. 2, the magnetic fields are dispersed so that most of the fields are through the receive coil. As is illustrated in FIG. 2, area 210 has the highest field at about 1E-2 Tesla and area 212 as a field of about 3E-3 Tesla. The field drops off so that area 214 has a field of about 3E-4 Tesla and area 216 has a field of 4E-5 Tesla. Consequently, as suggested above, most of the fields are received into the area of coil 204.

One skilled in the art will recognize that the field strength data provided in FIGS. 1 and 2 are relative and indicative of one example of these coils. Actual field strengths depend on the coil configuration, coil areas, number of turns, currents through the coils, and other parameters. Providing an example of field strengths provides relative indication of the performance of coil configurations.

Figure 3A:
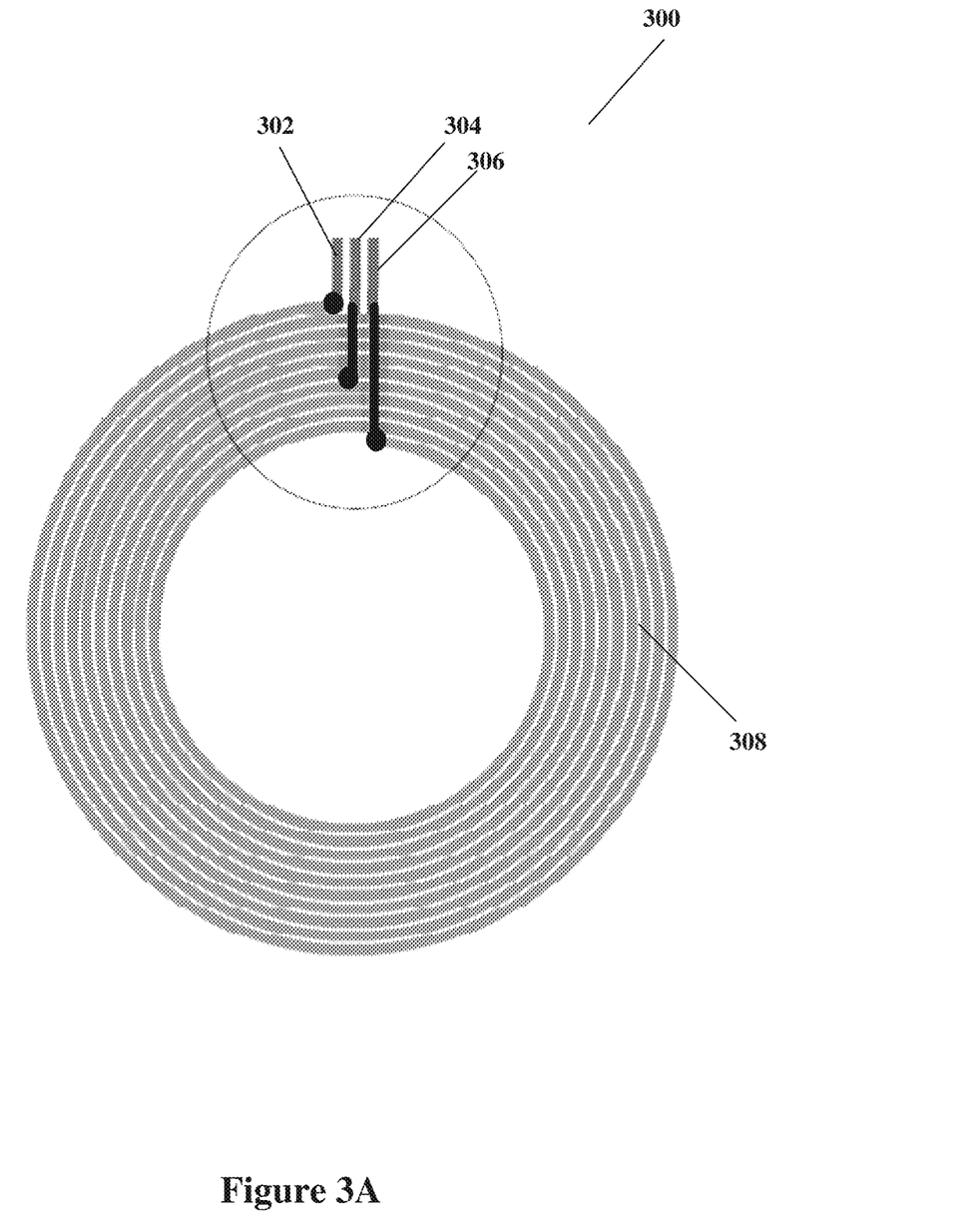
FIG. 3A illustrates a transmit coil according to some embodiments where the area can be adjusted.

In some embodiments, an extra tap in the transmit coil can be provided to reduce the area of the transmit coil as needed. Such a transmit coil 300 is illustrated in FIG. 3A. As illustrated in FIG. 3A, transmit coil configuration 300 includes a spiral winding 308 where a first tap 302 is coupled to on outside end of spiral winding 308 and a second tap 306 is coupled to an inside end of spiral winding 308. A third tap 304 can then be coupled to an intermediate point in spiral winding 308. In general, there may be multiple taps in the transmit coil in order to further adjust the area of the transmit coil relative to the receive coil, thereby reducing the amount of heating experienced in the power transfer process. Consequently, the size of the active portion of transmit coil configuration 300 can be adjusted to the size of a receive coil placed proximate to transmit coil 300 in order to reduce heating in the resulting system.

As illustrated in FIG. 3A, the third tap 304 can be configured to reduce the active area of transmit coil 300, however it also reduces the number of transmit coil winding turns, for example by half. The rectifier voltage $V_{rect}$, which is applied across the active portion of transmit coil 300, can then be decreased to compensate. For example, if tap 304 is arranged to decrease the number of turns in coil 308 by ½, the voltage $V_{rect}$ can be decreased by a factor of two, which may result in a decrease of voltage from 8V to 4V. Increasing the rectifier voltage (for example from 8V to 16V) can help to increase efficiency. Such systems may include a power management IC that boosts the voltage from a battery. The power receiver's Vrect node should be able to handle the increased voltage as well. Further, any large residual transmit ferrites can reduce the effectiveness of reducing the active area of transmit coil 300.

FIG. 3A illustrates a transmit coil 300 with one additional tap 304 coupled to an intermediate turn of coil 308. In this fashion, the size of transmit coil 300 can be modified according to conditions to provide better coupling to a corresponding receive coil. In some embodiments, more than one additional tap 304 may be added to provide for further flexibility on the size of the active portion of transmit coil 300. Furthermore, transmit coil 300 may be combined with further coils, as provided in FIG. 3B.

Figure 3B:
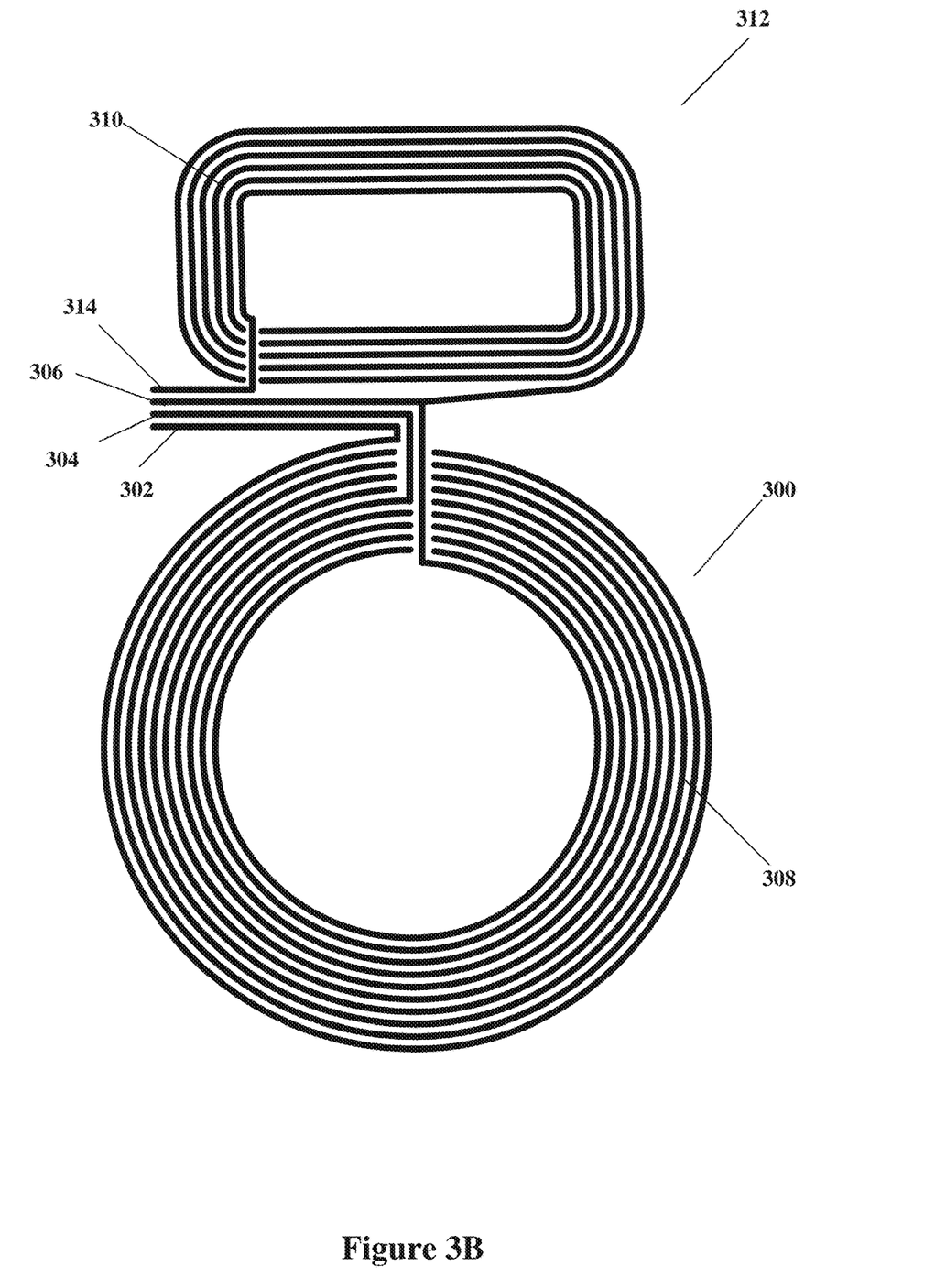
FIG. 3B illustrates a transmit coil according to some embodiments in combination with a MST coil.

FIG. 3B illustrates a coil configuration 312 formed with a combination of transmit coil 308 illustrated in FIG. 3A with a magnetic secured transmission (MST) coil 310. The combination of transmit coil 300 and MST coil 310 can be used in systems that provide for MST communications. As illustrated in FIG. 3B, MST coil 310 is coupled to tab 302 of transmit coil configuration 300 and provides another tab 314 to couple into coil 310. In some embodiments, portions of coil 308 are also used in MST communications.

Figure 4:
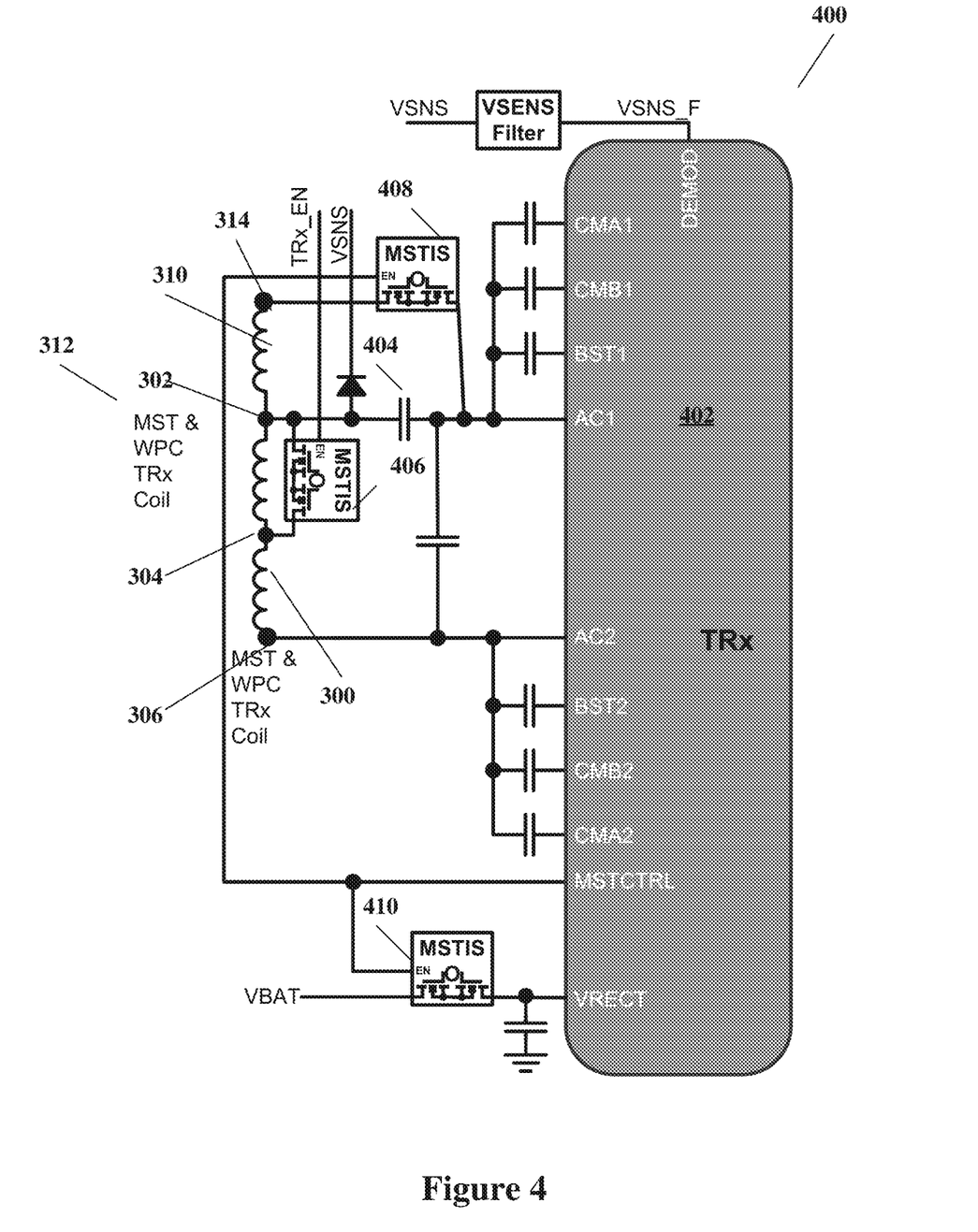
FIG. 4 illustrates the transmit coil in FIG. 3B coupled to a transmitter controller.

FIG. 4 illustrates transmit system 400 with a control system 402 coupled to transmit coil 300, which is illustrated in FIG. 3. Control system 402 can be a single IC that includes a switching circuit between outputs AC1 and AC2. Outputs AC1 and AC2 may be used for both wireless transmission of power and MST communications. The switching circuit is coupled to the voltage $V_{rect}$, which is provided to control system 402 through a switch 410 from the battery voltage $V_{bat}$. The input rectifier voltage $V_{rect}$ can be provided at any level, as discussed above. Transmit coil 300 is coupled between the outputs AC1 and AC2 where tabs 302 and 304 can be shorted with switch 406. Further, MST coil 310 can be coupled to provide communications. MST coil 310 can also be coupled between AC1 and AC2 to provide the communications, provided that the resulting resonant time constant of the MST coil produced by coil 310 and coil 300 is larger than the LC time with capacitor 404 in place.

Control system 402 may include a microcontroller operating firmware that can be used to control transmit coil and to handle magnetic secured transmission (MST) of data. Using the taps 302, 304, and 306 on the transmit coil 300 to reduce the area of the transmit coil can reduce thermals from friendly metal heating. In some cases, two back-to-back MOSFETs, which are illustrated as switches 406, 408, and 410, can be used for isolation of sections of coil configuration 312. Switches 406, 408, and 410 are controlled by control signals from control system 402. As indicated, switches 408 and 410 can be controlled to switch between MST mode and transmit mode. Switch 406 is controlled to reduce or expand the area of transmit coil configuration 300. In some embodiments, switch 406 may represent multiple individual switches that adjusts the size of coil 300 across a plurality of adjustment taps. Individual switches may be placed between pairs of taps in order to adjust the size of the active area of coil configuration 300. Furthermore, transmit coil 300 may be operated at a higher switching frequency. A higher voltage system input voltage may be used for efficiency and may be adjusted as discussed above when the number of turns on coil 300 are adjusted. Control system 402 can further monitor the efficiency of wireless transmission to adjust the area of coil configuration to be less than the area of a receiving coil placed proximate to transmission coil configuration 300.

An additional reason for changing the number of turns in coil configuration 300 is to align transmit coil 300 geometry with a corresponding receive coil geometry. Some coils have large OD and large ID, some have small OD and small ID. Changing taps allows control system 402 to arrange for good coupling (therefor good efficiency) to a wider range of coil sizes. Specific examples are coils for phones versus coils for watches. Phone coils tend to be 44 mm OD with 20 mm ID, while wearables tend to have 20 mm OD and 14 mm ID. So having a coil with an OD at 44 mm, a tap at 20 mm and an ID at 14 mm lets control system 402 adjust between a phone coil and a watch coil as needed.

Thermals may also be reduced through better input voltages. Power transfer efficiency can be improved where the transmitter uses 5V to 12V on the rectifier. In some cases, the transmit controller 402 may provide a boost input. The receiver charging system should be able to accept the additional voltages produced by the transmit coil 300 operating at higher voltages.

In some embodiments, MST coil 310 may be incorporated as illustrated in FIG. 3B as one or both sections of transmit coil 300. In such a case, transmit coil 300 can be tested for efficacy as a transmit coil for wireless power transfer and a communications coil for MST communications.

Figure 5A:
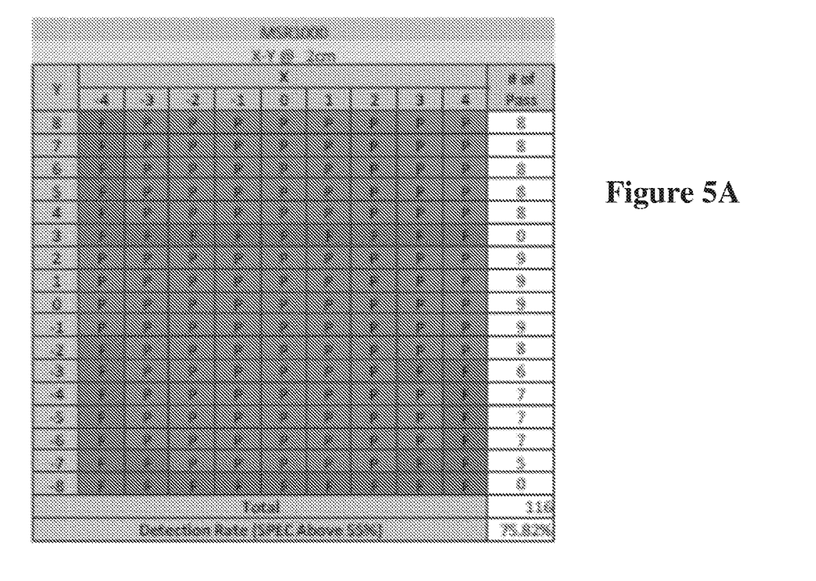
FIGS. 5A and 5B illustrate magnetic secured transmission performance around example MST coils according to some embodiments.
Figure 5B:
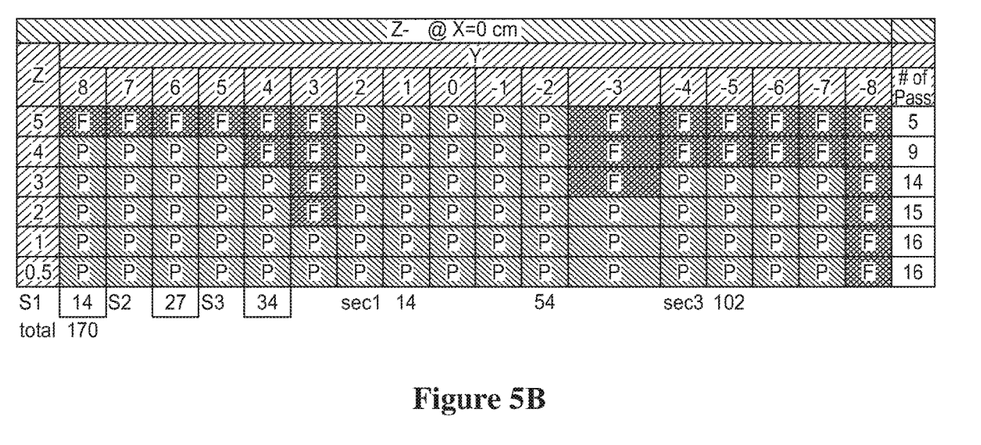

FIGS. 5A, 5B, 6A, 6B, 7A, and 7B illustrate MST testing operations for a conventional coil design configuration. The test coil design tested in these figures was similar to the coil illustrated in FIGS. 3A and 3B, except that there are no additional tabs like tab 304 connected to intermediate turns of the coil as is present in embodiments of the present invention. FIGS. 5A and 5B test a conventional coil with an attached MST component. FIGS. 6A, 6B, 7A, and 7B test a conventional coil without an MST component. Performance of certain embodiments of the present invention are discussed below. Testing is performed by measuring the MST transmission failure or pass with an MST receive coil positioned a certain distance above the plane of the coil as a function of position in the x-y plane. Further, performance can be tested in the y-z plane as well.

FIGS. 5A and 5B illustrate a MST operation map and test results with the test transmission coil with the MST segment connected. The coil under test, without an MST switch, is connected between AC1 and AC2 as is illustrated for transmission coil 300 in FIG. 4 and used as a MST coil. $V_{rect}$ is set at 4.2V and the data transmission rate is set with a baud rate of 900 µS. The tested transmission coil, which includes a transmission coil and MST coil, is a coil with inductance L=20.48 µH and a resistance R of 1.8 ohm. FIG. 5A illustrates a map in the X-Y plane with the center of a receive coil positioned at 2 cm above the tested transmit coil and positioned with the indicated x-y positions. FIG. 5B illustrates a similar z-y map with x set at 0 cm. Conventionally, the area of the transmit coil is the x-y plane while the distance from the transmit coil is designated as the z direction. FIGS. 5A and 5B illustrate the range of relative positions of the receive coil about a transmit coil such as coil 300 where MST data can be transmitted. As illustrated in FIG. 5A, the pass-rate in the x-y plane is a total of 116 passes out of 153 positions (a 75.8% success rate) for transmission of data at each position. The testing here is performed with a switched MST as has been disclosed in U.S. application Ser. No. 16/028,207, filed on Jul. 5, 2018, which is herein incorporated by reference in its entirety.

Figure 6A:
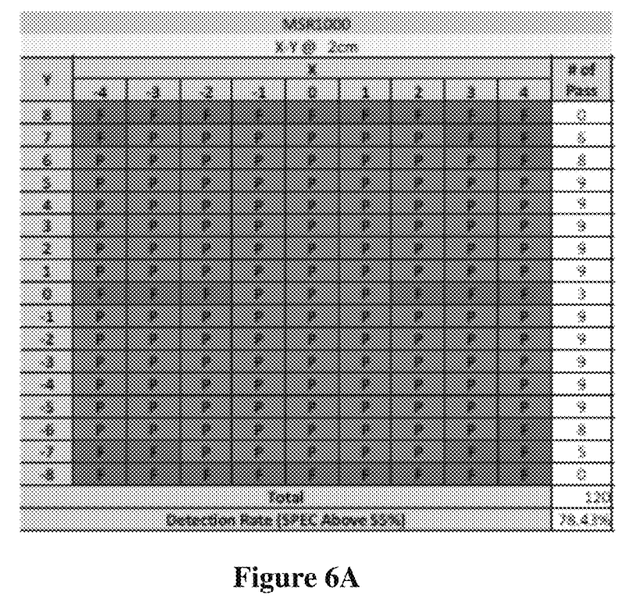
FIGS. 6A and 6B illustrate magnetic secured transmission performance around another example of coils according to some embodiments.
Figure 6B:
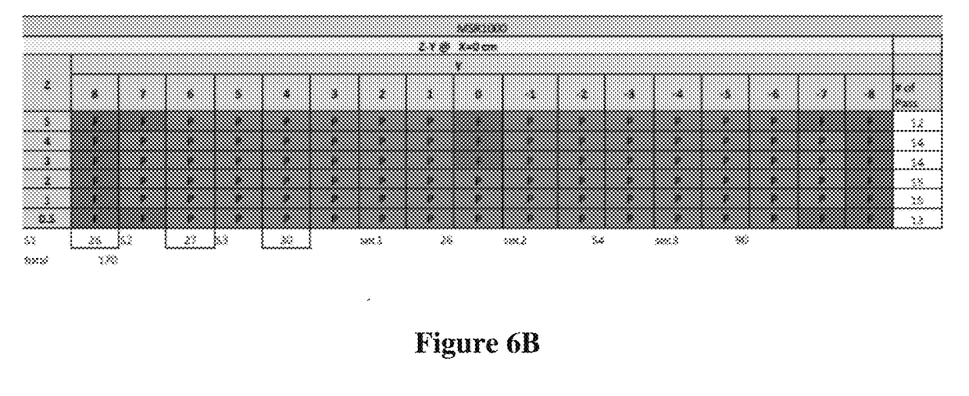

FIGS. 6A and 6B illustrates a similar test with the same test coil where the associated MST coil is not used. The test coil is connected between AC1 and AC2 as illustrated by transmit coil 300 in FIG. 4. In this test configuration, $V_{rect}$ is set at 4V and the MST baud rate is set at 300 µS. The transmission coil (without the MST portion) has an inductance of L=8.5 µH and resistance R=0.36 ohm. The coil current is kept at 3 A. As before, FIG. 6A illustrates in the x-y plane the effectiveness of transmission of data with a receiver coil at a distance z=2 cm above the x-y plane of the transmission coil and positioned at the x-y position indicated. FIG. 6B illustrates the effectiveness in the y-z plane with x being held at 0. As illustrated in FIG. 6A, the pass-rate in the x-y plane is a total of 120 (78.4%), which is a little better than that configuration illustrated in FIGS. 5A and 5B.

Figure 7A:
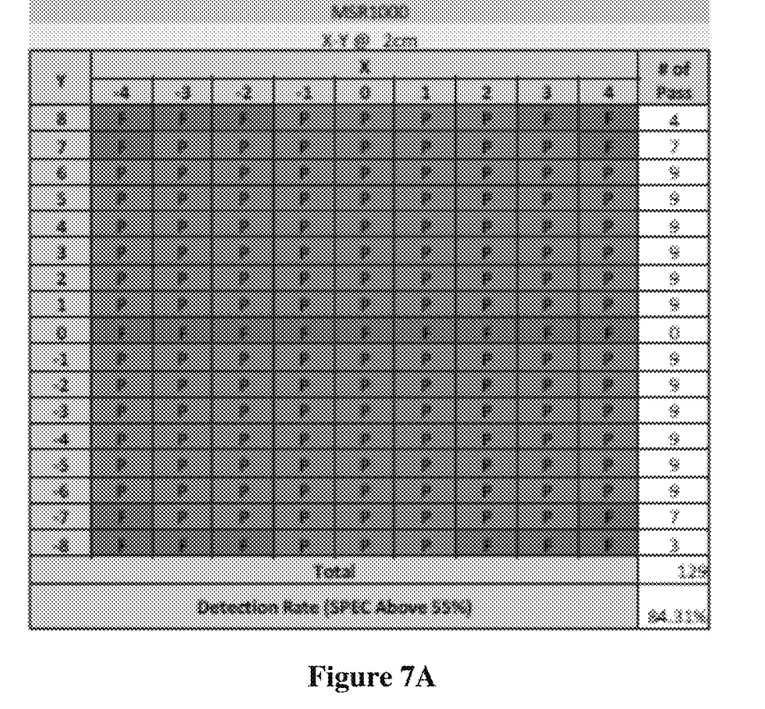
FIGS. 7A and 7B illustrate magnetic secured transmission performance around another example of coils according to some embodiments.
Figure 7B:
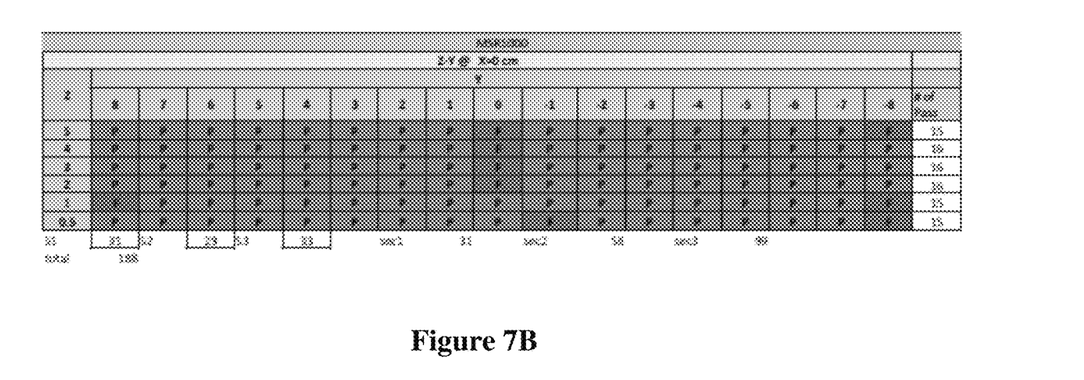

FIGS. 7A and 7B illustrates a similar test with the test coil configured as described in FIGS. 6A and 6B with the current through the coil increased. FIG. 7A illustrates the performance for MST data transfer in the x-y plane with the receiver coil positioned at a z-distance of 2 cm over the x-y plane of the transmitter coil. FIG. 7B illustrates the performance as the receive coil is moved through the y-z plane with x=0. As illustrated in FIG. 7A, the pass-rate in the x-y plane rises to a total of 129 (84.3%), which is improved.

As such, the test is performed with the wireless power coil only (no MST coil) connected between AC1 and AC2 as illustrated in FIG. 4. $V_{rect}$=4V and the MST baud rate is set at 300 µS. As described above, the coil has an inductance of L=8.5 µH and a resistance of 0.36 ohm. The coil current is set at 3.8 A. As is illustrated in FIGS. 7A and 7B, the increased current provides for a better performance of MST of data.

Embodiments of the present invention as illustrated in FIGS. 3A and 3B can result in much higher test results. In similar tests as discussed above, coil 312 as discussed above can result in a pass rate in the x-y plane totaling 170 with the combination of coil 308 and coil 310, with switch 406 as illustrated in FIG. 4 engaged. Using only coil 308, the pass rate can be 142. Further, as discussed above transmission coil 300 can be configured to adjust the size of the active portion of transmission coil 300 so that heating is reduced during power transfer. The MST performance can be better with transmission coil configuration 312 and further the performance can be improved by increasing the current through transmission coil 312.

Figure 8A:
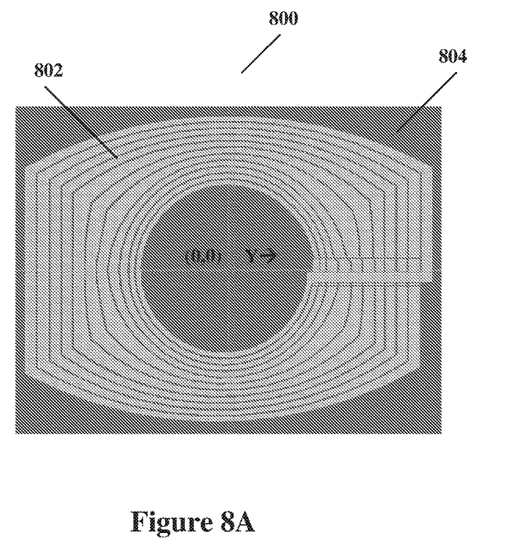
FIGS. 8A, 8B, and 8C illustrate the field performance of various coil designs according to some embodiments.
Figure 8B:
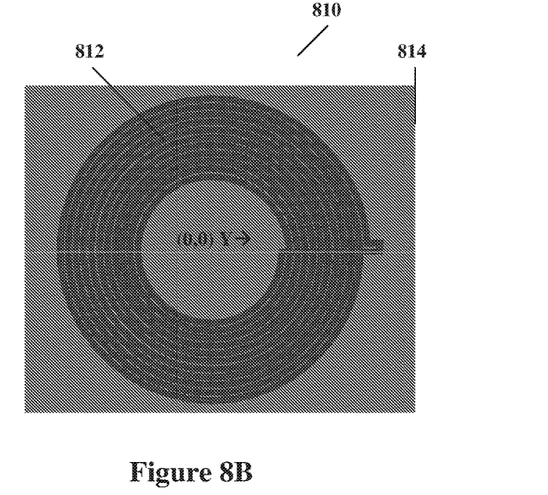
Figure 8C:
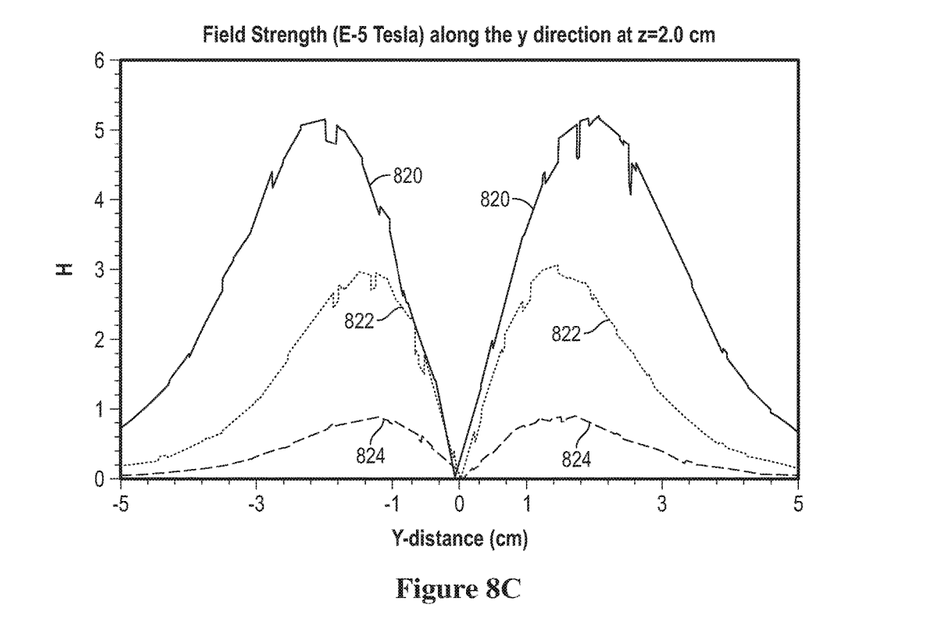

In addition to providing transmit coils with multiple taps such as transmission coil 300 as illustrated in FIGS. 3A and 3B, the shape of the MST coil 310 can be adjusted to optimize MST transmission performance. FIGS. 8A, 8B, and 8C illustrate some effects of coil shape on the performance of transmit coils in both wireless power transfer and in MST data transfer.

FIG. 8A illustrates an oval MST coil 800 that can be used as coil 310 as shown in FIG. 3B according to some embodiments of the present invention. Oval MST coil 800 can include oval windings 802 formed on a substrate 804. In some embodiments, substrate 804 can be a ferrite material. Similarly, FIG. 8B illustrates a circular MST coil 810 that can be used as MST coil 310 as illustrated in FIG. 3B. Circular coil 810 includes windings 812 arranged on a substrate 814. Again, substrate 814 may be a ferrite material. In some embodiments, circular coil 810 may represent coil 308 where no MST coil 310 is present in the system (e.g., MST transmission is performed through transmission coil 308).

FIG. 8C illustrates magnetic field strength of the y-component of the magnetic field as a function of position at a height of 2 cm over the tested coil. In the illustration of FIG. 8C, the tabs of oval transmission coil 800 and circular transmission coil 810 use the full coil. In FIG. 8C, curve 820 illustrates the magnetic field strength of the y-component of the magnetic field produced by a 6 cm wide (in the y-direction) oval coil 800. Curve 822 illustrates the magnetic field strength of the y-component of the magnetic field produced by a 10 cm diameter circular coil 810. The coils can be arranged to have the same coil resistance characteristics. As is illustrated, both the WPC and MST coils and the WPC only coil pass the MST testing. In some embodiments, extra ferrite can be used for oval coil 800. Further, a high current in the circular transmission coil 810 can be used. Curve 824 illustrates a conventional WPC coil. As can be seen, the oval coil greatly enhances the y-component of the magnetic field over the coil area.

In some embodiments, as discussed above, MST improvement can be seen using an oval shaped coil. Further, extra ferrite can be used. Coil resistance (DC and AC resistance) can be expected to match that of the transmission coil 308 as illustrated in FIG. 3B. Such an arrangement can provide about a 25% better coverage with pass-rate testing results being much higher. Further, higher currents can be used in some embodiments. However, such an approach may result in ferrite saturation, increased battery draw, and increased controller IC sizes.

Figure 9A:
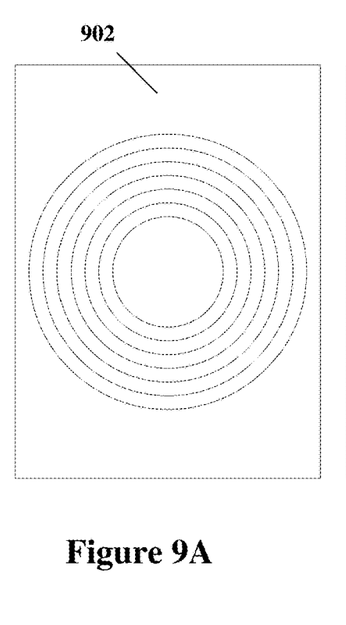
FIGS. 9A, 9B, 9C, and 9D illustrate some coil design shapes that can be used in embodiments of the present invention.
Figure 9B:
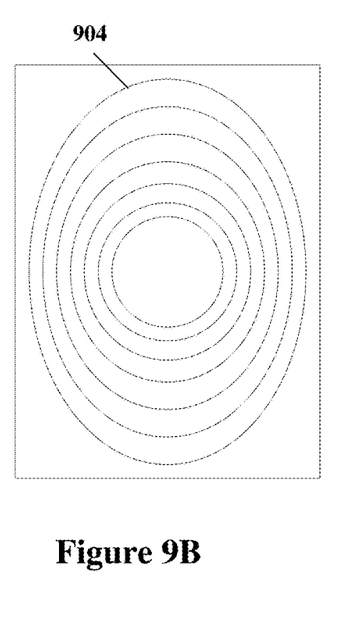
Figure 9C:
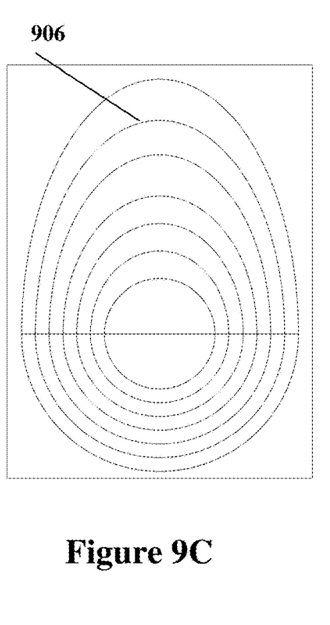
Figure 9D:
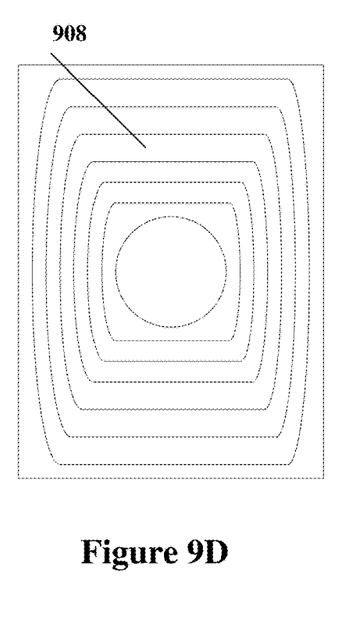

FIGS. 9A, 9B, 9C, and 9D illustrate various shapes of a coils that can be used as coil 310 in coil structure 312 according to some embodiments of the present invention. FIG. 9A illustrates a circular coil 902. FIG. 9B illustrates an oval coil 904. FIG. 9C illustrates an "egg shaped" coil 906. FIG. 9D illustrates a square coil 908. As discussed with respect to coil 310 of coil structure 312 illustrated in FIG. 3B, each of coils 902, 904, 906, and 908 may be combined with a transmission coil 308 having multiple taps in order to adjust the active area of the transmission coil to reduce heating. As discussed with FIG. 8C, the oval transmission coil 904 may result in a flux increase of about 25% along the center axis. However, egg-shaped transmission coil 906 may provide the greatest field at the top of the phone, which is where that flux is desired for better MST transmission.

The above detailed description is provided to illustrate specific embodiments of the present invention and is not intended to be limiting. Numerous variations and modifications within the scope of the present invention are possible. The present invention is set forth in the following claims.

What is claimed is:

1. A coil configuration for a wireless transmitter, comprising:
   a plurality of turns coupled between a first tap coupled to an innermost turn and a second tap coupled to an outermost turn;
   at least one adjustment tap coupled to at least one turn of the transmitter coil between the innermost turn and the outermost turn; and
   a magnetic secured transmission (MST) coil coupled to the second tap.

2. The coil configuration of claim 1, wherein the MST coil includes a plurality of turns formed in a circular shape.

3. The coil configuration of claim 1, wherein the MST coil includes a plurality of turns formed in an oval shape.

4. The coil configuration of claim 1, wherein the MST coil includes a plurality of turns formed in an egg shape.

5. The coil configuration of claim 1, wherein the MST coil includes a plurality of turns formed in a square shape.

6. The coil configuration of claim 1, further including ferrite material.

7. A method for wireless transmission of power, comprising:
   driving a transmission coil comprising a plurality of turns with an innermost turn coupled to a first tap and an outermost turn coupled to a second tap, and at least one adjustment tap coupled to at least one turn of the transmission coil between the innermost turn and the outermost turn; and
   adjusting an area of the transmission coil using the at least one adjustment tap according to an area of a receiver coil.

8. A wireless power transmission system, comprising:
   a transmission controller;
   a transmission coil, the transmission coil comprising a plurality of turns with an innermost turn coupled to a first tap and an outermost turn coupled to a second tap, and at least one adjustment tap coupled to at least one turn of the transmission coil between the innermost turn and the outermost turn, the second tap coupled to a first output node of the controller and the first tap coupled a second output node of the controller;
   at least one switch coupled controlled by the controller and coupled between the second tap and the at least one adjustment tap,
   wherein the transmission controller adjusts the at least one switch to control an active area of the transmission coil,
   wherein the transmission coil is configured as a magnetic secured transmission (MST) coil.

9. A wireless power transmission system, comprising:
   a transmission controller;
   a transmission coil, the transmission coil comprising a plurality of turns with an innermost turn coupled to a first tap and an outermost turn coupled to a second tap, and at least one adjustment tap coupled to at least one turn of the transmission coil between the innermost turn and the outermost turn, the second tap coupled to a first output node of the controller and the first tap coupled a second output node of the controller;
   at least one switch coupled controlled by the controller and coupled between the second tap and the at least one adjustment tap,
   wherein the transmission controller adjusts the at least one switch to control an active area of the transmission coil, and
   wherein the active area of the transmission coil is adjusted by the transmission controller to be smaller than an area of a receiver coil.

10. The transmission system according to claim 9, wherein the plurality of turns of the transmission coil are formed on a substrate that includes ferrite.

11. The transmission system according to claim 9, further including a magnetic secured transmission (MST) coil coupled to the second tap of the transmission coil, wherein the transmission controller is further coupled to a magnetic secured transmission (MST) coil.

12. The transmission system according to claim 11, wherein the MST coil includes a plurality of turns arranged in a circular shape.

13. The transmission system according to claim 11, wherein the MST coil includes a plurality of turns arranged an oval shape.

14. The transmission system according to claim 11, wherein the MST coil includes a plurality of turns arranged in an egg shape.

\* \* \* \* \*